United States Patent [19]

Broderick et al.

[11] 4,050,810
[45] Sept. 27, 1977

[54] INSTANTANEOUS IMAGING MICROFILM RECORDING CAMERA WITH BLIP CONTROL

[75] Inventors: Milan A. Broderick, Riverwoods; Eugene V. Mateja, Norridge, both of Ill.

[73] Assignee: Bell & Howell Company, Chicago, Ill.

[21] Appl. No.: 605,122

[22] Filed: Aug. 15, 1975

[51] Int. Cl.² ............... G03B 27/32; G03B 27/52; G03B 27/70
[52] U.S. Cl. .................. 355/40; 355/65; 355/77
[58] Field of Search ............ 355/50, 106, 100, 112, 355/77, 13, 39, 40, 43, 49, 51, 64, 65, 66, 55, 56, 58, 57

[56] References Cited

U.S. PATENT DOCUMENTS

| | | | |
|---|---|---|---|
| 2,606,478 | 8/1952 | Pratt et al. | 355/65 |
| 2,660,089 | 11/1953 | Olson | 355/77 X |
| 3,248,029 | 4/1966 | Money | 355/50 |
| 3,252,370 | 5/1966 | Luther | 355/64 X |
| 3,279,312 | 10/1966 | Rogers | 355/65 |
| 3,509,807 | 5/1970 | Sutton et al. | 355/64 X |
| 3,576,368 | 4/1971 | Goetz et al. | 355/57 X |
| 3,598,489 | 8/1971 | Thomas et al. | 355/57 X |
| 3,645,619 | 2/1972 | Burton et al. | 355/40 |
| 3,663,102 | 5/1972 | Zerfahs | 355/13 X |
| 3,711,199 | 1/1973 | Koizumi | 355/57 |
| 3,750,553 | 8/1973 | Pfeifer et al. | 355/40 X |
| 3,817,618 | 6/1974 | Riley et al. | 355/100 |
| 3,836,252 | 9/1974 | Touchette et al. | 355/100 |
| 3,853,401 | 12/1974 | Inoue et al. | 355/106 |
| 3,902,802 | 9/1975 | Murata et al. | 355/43 |

FOREIGN PATENT DOCUMENTS

| | | | |
|---|---|---|---|
| 892,755 | 1/1944 | France | 355/39 |

Primary Examiner—Donald A. Griffin
Attorney, Agent, or Firm—Robert A. Walsh

[57] ABSTRACT

A microfilm camera uses an instant imaging film, such as a vesicular film. Simultaneously with the exposure of the film, a small blip is recorded along the length of the film. On readout, the camera may be set to count the number of blips and thereby stop a searching reader at a preselected frame. The invention is primarily directed to a circuit for controlling the recording of the microfilm images and the blips on such instant imaging or vesicular film.

16 Claims, 8 Drawing Figures

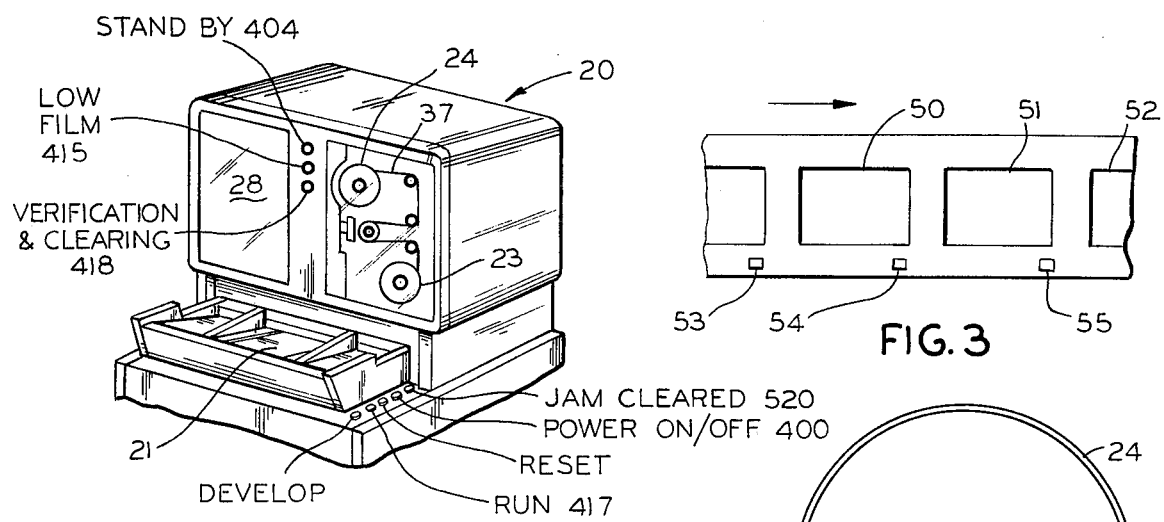
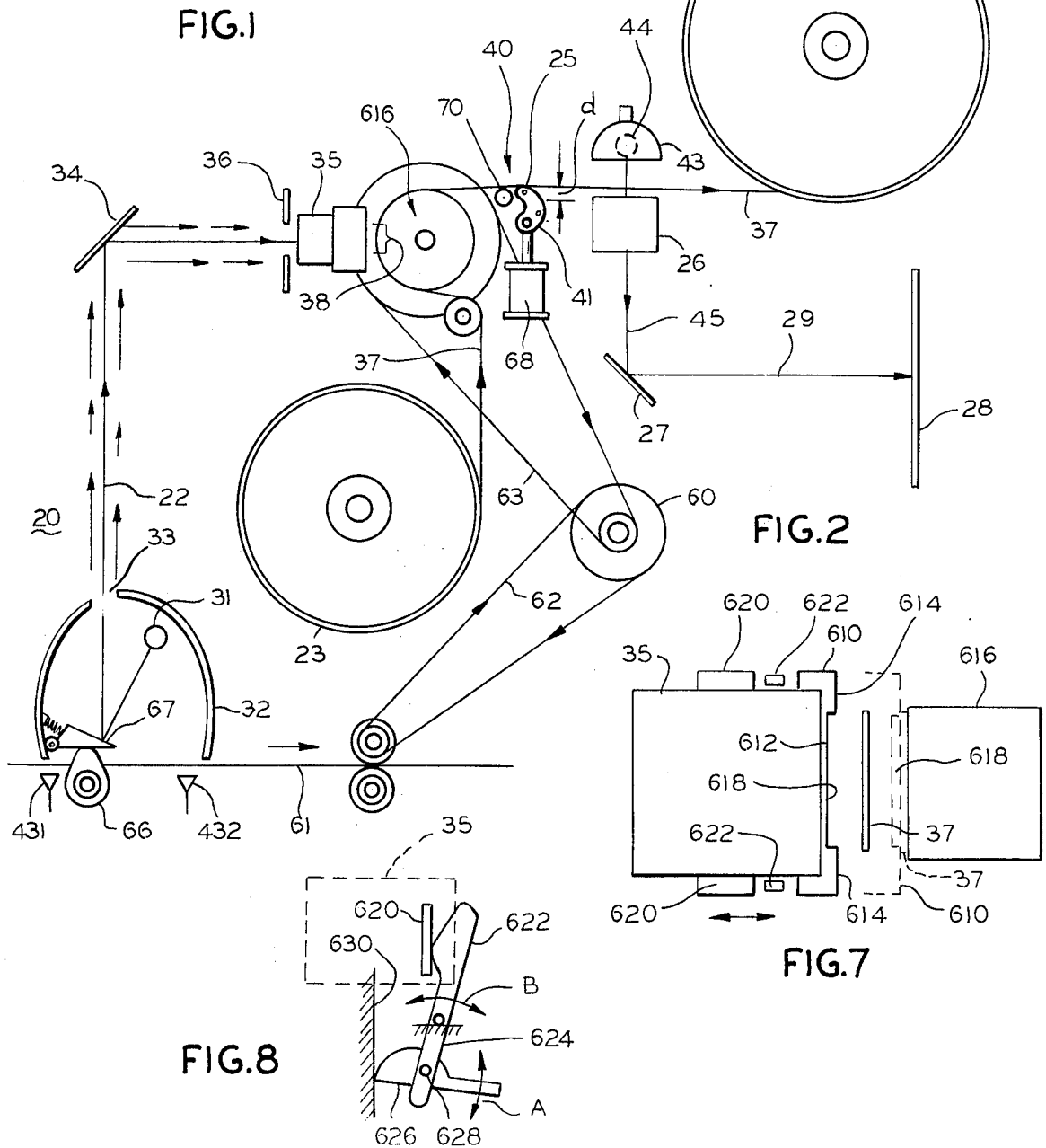

INSTANTANEOUS IMAGING MICROFILM RECORDING CAMERA WITH BLIP CONTROL

This invention relates to microfilm recording cameras and more particularly to such cameras using instant imaging film, such as vesicular film, with means for recording blips to enable automatic searching for a preselected frame.

The invention uses any suitable instant imaging film, such as a vesicular film, upon which information can be recorded when the film is exposed by ultraviolet light and developed by heat. One type of instant imaging film is described in the magazine "Image Technology" for August/November, 1973, and sold by the Kalvar Corporation of New Orleans, La., and by Xidex of Sunnyvale, California. However, the invention also finds use with other forms of instant imaging film; therefore, the term "vesicular film" is used hereinafter to describe all types of film which may be used with the described equipment.

More particularly, vesicular film photodecomposes to give a gaseous product when excited by light of the proper wavelength (e.g., ultraviolet light). The film includes a polymeric matrix coated or a base such as polyethylene terephthalate. The light sensitive compound can be any one of a number of materials but is most commonly a diszonium salt which photodecomposes to give nitrogen gas. The polymer matrix is thermoplastic so that it expands at the temperature of development and under the pressure of the gas photo formed in the vesicular structure. The polymer must also have a low permeability to the released gas so that the latent image is not lost.

The gas supersaturates the matrix, creating internal stress, which is relieved during thermal development. The softening of the thermoplastic, at the development temperature, permits the gas to diffuse, nucleate, and expand to form vesicles or tiny bubbles.

The microscopic bubbles cause inhomogeneities in the polymeric matrix and the resulting difference in refractive index causes a scattering of light in the image area, rather than absorbing it as in conventional photographic systems.

The light scattering bubbles, which can vary from less than 0.5 microns to 2 microns in diameter, are cavities surrounded by a shell of crystal-like material. As a result, these light scattering elements are highly resistant to environmental changes. Opacity is primarily obtained by the reflection and refraction of the incident light. When viewed on a transparent base, the exposed areas appear white; and the non-light struck, or clear, areas appear dark. However, when viewed by transmitted light, the areas in which there are light scattering elements appear dark, and the clear areas appear white. Therefore, the film produces a negative when viewed with transmitted light.

The film is not photographically sensitive to ordinary levels of visible light. The film is sensitive to energy in the spectral region supplied by both high and low pressure mercury vapor lamps. However, there is enough ultraviolet in black-light fluorescent tubes, carbon arc lamps, and in tungsten lamps to make them usable exposure sources.

The film is developed by any method of heating the film sufficiently to produce a permanent, high quality image. The heat may be conducted into the film by a heated roller, a platen, or other heat-transfer medium, such as glycerin. The latent image in the film decays at an exponential rate and a loss of image will occur if an excessive time elapses between exposure and development.

Therefore, after exposure and development, the non-light struck areas still contain an undecomposed sensitizer which can fog if subsequently exposed to ultraviolet light and heated unless the film is fixed. Consequently, the exposed and developed film is exposed to about four times the amount of ultraviolet light required for a maximum exposure. This light completely decomposes the residual sensitizer. The film must be protected from a temperature above 110° F. for several hours so that the gas may completely diffuse from the film.

Microfilm cameras are also well known devices which make it possible to reduce filing space requirements to a bare minimum by photographically reproducing and preserving the images of a long series of documents. When such a microfilm is reproduced, or otherwise readout, it is necessary to search for one frame. This is a time consuming process. Therefore, it is desirable to provide means for automatically searching out any frame identified by a numerical address. Even such a time saving search usually does not avoid the awkward and difficult adjustments of the microfilm systems to insure a well centered print. Therefore, aside from saving the time required to locate and readout the desired frame, there is a convenience if the desired frame is automatically reproduced without bothering a busy person to visually inspect and center the image.

Accordingly, an object of the invention is to provide new and improved automatically searching microfilm systems. Here, an object is to provide microfilm systems which record frame identifications simultaneously with the copying of a document. In particular, an object is to provide an automatic microfilm camera which sequentially records "blips" at fixed locations with respect to each recorded frame.

Still another object of the invention is to provide a new and superior microfilm process. Here, an object is to enable better quality control through a use of instant image display. In this connection, an object is to provide a new and superior microfilm system which makes it easier to retrieve recorded data.

In keeping with an aspect of this invention, these and other objects are accomplished by providing a microfilm camera which uses vesicular film, with a blip recorder. Each time that a frame is copied, a blip is simultaneously recorded along the edge of the film. This way, an operator may preset a particular number which a readout machine may count responsive to each blip. When the preselected number of blips have been counted, the desired image frame is in the readout position. Also, the blip may be aligned so that a printout of the desired frame is automatically well centered. The invention provides for accurately recording the blips.

The nature of a preferred embodiment of the invention will become more apparent from a study of the attached drawings, wherein:

FIg. 1 is a perspective view of the inventive microfilm camera;

FIG. 2 is a schematic view of the mechanical and optical aspects of the inventive camera;

Figure 4:
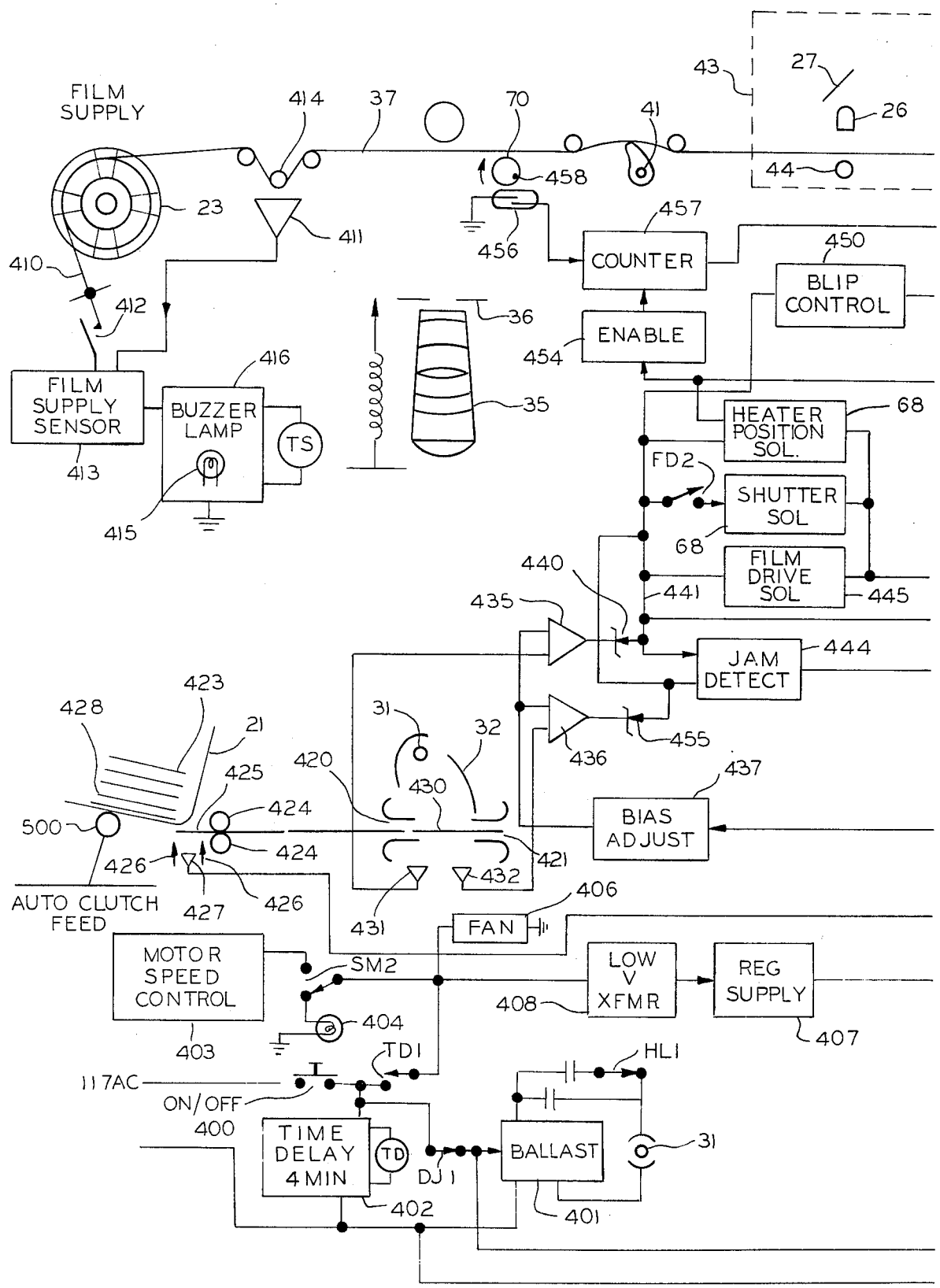
Figure 5:
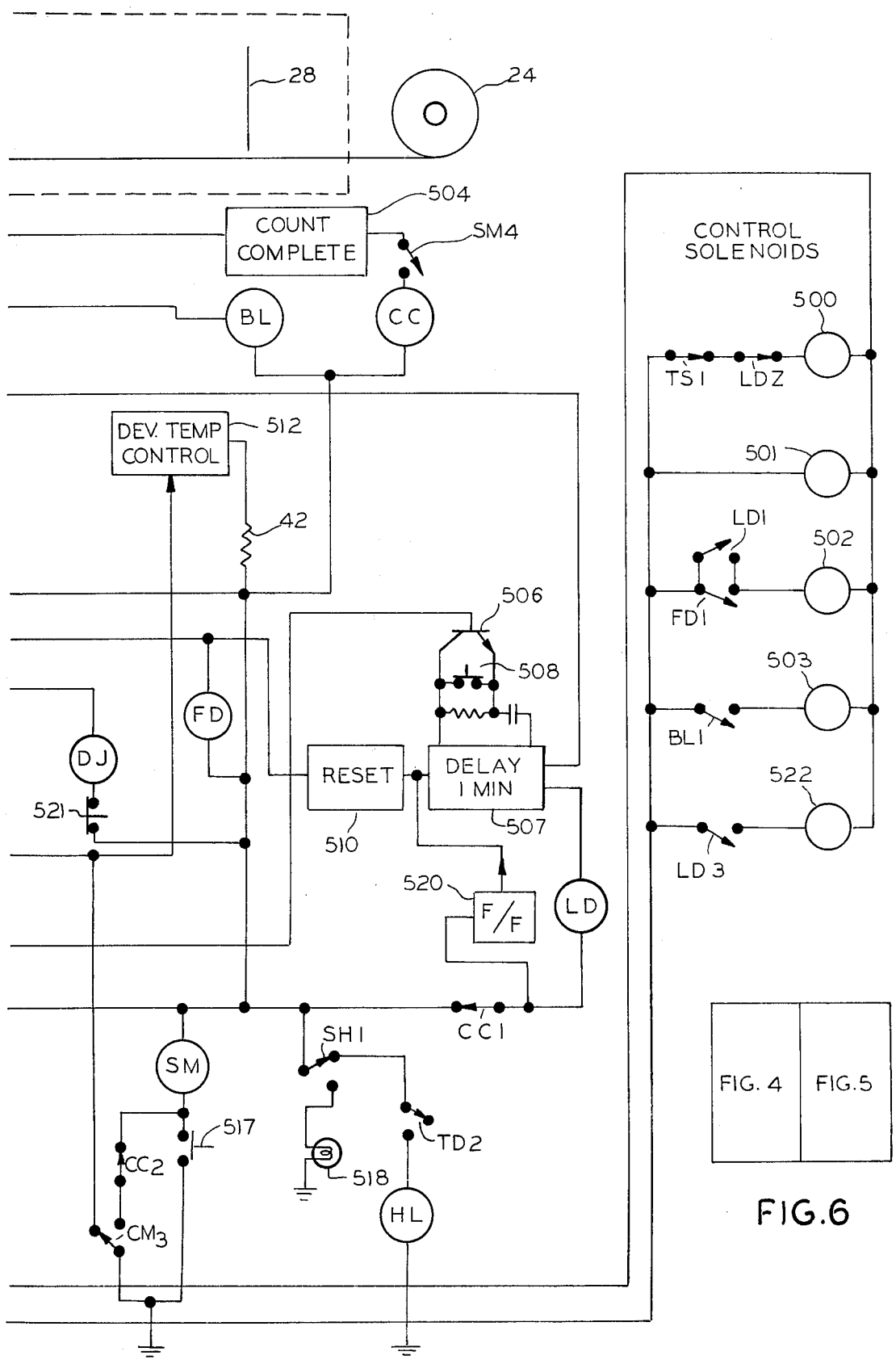

FIG. 3 schematically illustrates a small length of microfilm with blips recorded thereon;

FIGS. 4 and 5 are logic circuit for controlling the camera of FIG. 1;

FIG. 6 is a diagram showing how FIGS. 4 and 5 are to be assembled;

FIG. 7 is a diagrammatic view of a means for moving the lens into and out of position whereby the film is biased against the drive capstan and the lens rides on a portion of the film; and FIG. 8 is a view of the cam operator for moving the lens into and out of engagement with the film.

The principle portions of the inventive camera 20 (FIGS. 1, 2) are a document feed area 21, an image optical path 22, a film supply reel 23, a take-up reel 24, development stations 25, and readout equipment 26, 28 associated with a secondary optical path 29. The screen 28 is an inspection station or viewing screen for confirming quality of the copy as it is photographed.

The document feed area 21 comprises a bin or bed for receiving a stack of papers, or alternatively it may receive a book, blueprint, paper, photograph, or other similar material (herein collectively called "documents").

Any document appearing in this area is driven at a predetermined speed past an ultraviolet light source 31 which is positioned inside a reflector 32 having internal contours which reflect and concentrate the light upon the document as it moves at the predetermined speed through the document feed area. Hence, the lighted image in the document feed area is reflected through a slit 33 in the reflector 32 and along an image optical path 22, which includes a mirror 34, a focusing lens 35, and a shutter 36. The image in the optical path is focused on the vesicular film 37 which feeds from supply reel 23 through a format area 38 to take-up reel 24.

The document in area 21 feeds through the copier in synchronism with the film 37. Therefore, the image copied onto the moving film 37 is a faithful reproduction of the document image in the light beam passing through the slit 33. The physical parameters are not too relevant to the invention; however, an exemplary system might, for example, copy the image of one typical document every two or four seconds. The document may travel under the slit 33 at a speed of three to four inches per second. The slit 33 may have a width in the order of three quarters of an inch to one inch. The other parameters can be easily developed from these dimensions.

The light source 31 is primarily a source of ultraviolet light which releases a gas in the film 37. Since the black areas in the document (e.g. print) do not reflect any appreciable amount of light, no appreciable gas is released in those parts of the film in the format area 38 which receive the image of these black areas. Conversely, the white areas on the document (e.g., the white paper) do reflect a maximum amount of ultraviolet light, and a maximum amount of gas is released from the corresponding parts of the film in the format area 38. In between black and white, shades of gray will cause release of measured amounts of gas to give varying photographic effects on the film.

Once the gas begins to be released, it is necessary to soften the plastic of the film so that bubbles may form therein to produce an image on the film. When the film cools, the image sets. If the film is not heated after exposure to ultraviolet rays, the released gas merely escapes, the image faces, and the film loses its ability to take on an image.

For these reasons, a heating station 40 is positioned along the film path immediately after the format area 38. More particularly, the heat from a shoe 41 heated by a heating coil 42 (FIG. 4) thus sets the image formed at 38.

At this point, the gas released responsive to the ultraviolet light has been set into the heat softened film or otherwise neutralized so that it is no longer affected by ultraviolet light. However, the gas remaining in the black areas which did not receive ultraviolet light has not been released. Therefore, if the film is again exposed to ultraviolet light and heated, the image of the photocopy may deteriorate or be lost.

Accordingly, the next or fixing station 43 includes a secondary source 44 of ultraviolet light for releasing all gas remaining in the film, thereby completely neutralizing the film. This secondary light 44 is reflected on mirror 27 and onto the viewing screen 28. Although the light from source 44 is "ultraviolet", it is not pure. Therefore, there is enough light in the visible range for the human eye to see the image focused on screen 28.

The light from source 44 strikes the entire width of film 44. It can have no effect upon the image of previously released gas which was set by the heat of shoe 41. However, it can release the gas in the black image areas where gas was not previously released at format area 38. Since there is no heating station adjacent the film path after it has left the secondary lighted area 43, the newly released gas merely escapes from the film in time, without permanent effect upon the film. After this time, the film is stable and the image is fixed for the life of the film.

An operator watches the inspection screen 28 and sees the quality of the image on the screen. Therefore, if a photocopy is defective, the operator knows immediately and can feed the document through the camera again. This way, a non-defective copy will appear on the film.

Later, it will be necessary to find and reprint selected frames on the microfilm 37, when the desired data information is to be retrieved. This data retrieval can be sped up if there is means for counting and finding the desired frame. For this reason, the film is exposed, as shown in FIG. 3, where the images of documents 50-52 of any suitable length may be formed at random along the length of the film.

To facilitate a countdown to a desired document image, a small spot (called a "blip") is formed along the film edge at specific locations 53-55 with respect to the document images. For readout, a counter may count blips until a predetermined one is reached, and then the indicated image may be displayed on a screen or printed on paper. Since the blip is precisely located with respect to the document image, the display or printout may be properly centered on the screen or paper.

All of these features are provided by the inventive camera in a simple and low cost manner. In greater detail, a single motor 60 drives both the film 37 and the document 61 in the directions of the arrows and at coordinated speeds, which automatically results from a selection of proper pulley diameters associated with drive belts 62, 63. Thus, if there is a 24:1 reduction, for example, the document will travel twenty-four times faster than the film will travel. The shutter 36 is opened and the document and film speeds are such so that a true and non-blurred image is formed on the film. After the document clears the reading area (slot 33), the shutter is closed.

A cam 66 is also coordinated with document motion so that a blip mirror 67 is raised to a light reflecting position each time that a leading (or trailing) document edge is detected. The blip mirror 67 is at one side of the document area so that the blip is formed on the edge of the film. Moments later, the cam 66 lowers the blip mirror 67 to terminate the blip 53-55 recorded on the film edge.

Also synchronized with document and film travel is the heating shoe 41 which is raised or lowered a distance by a solenoid. When an exposure begins, solenoid 68 is energized and the heating shoe 41 is raised to engage the film. After the exposure is completed, means 70 is operated by the running film to produce a suitable number of counts representing the length of the films between the format area 38 and the fixing light 44. Then the film drive is stopped.

The electrical control circuit for the camera is shown in FIGS. 4, 5, when assembled as shown in FIG. 6. Those parts which are common to the various figures are identified by the same reference numerals. Therefore, all parts having a two digit reference numeral may be understood from the foregoing specification. Reference numerals in the 400-series are found in FIG. 4 and those in the 500 series are found in FIG. 5.

Circuit operation is initiated when a manual power off/on switch 400 is switched on. Contacts 400 also energize a ballast circuit 401 which controls the power supplied to the ultraviolet lamp 31. With HG1 contacts in the position shown, the lamp 31 is lit at high power (such as 1000-watts) to provide a copy level of illumination. Later, after the camera is warmed-up, contacts HF1 will open to lower the illumination level to a stand-by level (such as 600 watts). This stand-by level eliminates an illumination inertia and enables a quicker high light level for copying. A time delay circuit 402 measures four (or five) minutes and then operates a time delay relay TD. This period is long enough to insure that all elements are properly heated. It is though that most people will wish to turn on the camera in the morning and to turn it off in the evening. Hence, the four minute delay will occur only once a day.

At the end of the initial heat-up time (e.g., 4 minutes), relay TD operates. The contacts TD1 close to prepare a motor speed control circuit 403, to light a stand-by lamp 404, to turn on a fan 406, and to energize a regulated power supply 407 via a low voltage transformer 408. When the power supply 407 is energized, a flip-flop 520 is operated to inhibit a one-minute delay timer 507 except when it is energized via a reset circuit 510.

The time delay relay TD contacts TD2 close to operate a high-low relay HL via contacts SM1. Responsive thereto, contacts HL1 open to reduce the lamp voltage to the stand-by level, such as 600-watts.

Two detectors 410, 411 are associated with the film. Detector 410 includes an arm which rides on the outside periphery of the film wound on supply reel 23. When there is a low film, contacts 412 close to energize film sensor circuit 413 and inhibit operation of the camera. Sensor 411 operates responsive to a spring loaded wheel 414 riding on the film. When film tension is lost, wheel 414 moves and circuit 411 feeds a signal to the film sensor circuit 413 to inhibit operation of the camera.

As long as there is an ample supply of film and suitable film tension, circuit 413 supplies no current to circuit 416. However, if the film supply is exhausted or if tension is lost, circuit 413 supplies current to circuit 416. A buzzer sounds and lamp 415 lights. Tape sensor relay TS operates and TS1 contacts open a circuit to an automatic feed clutch 500. Thereafter, the camera will not feed new documents until the film supply is replenished and the sensors 410, 411 give an appropriate signal.

Of course, the document drive clutch 501 and the film drive clutch 502 could also be opened at this time. However, it is not desirable to stop the document in the heat of reflector 32 since it could be damaged or destroyed. Also, when the film tension is lost, there is enough remaining film to record at least the document passing through the reading area.

The operator sees the lit stand-by light 404 and knows that the camera has heated sufficiently to begin copying documents. Therefore, run button 517 is pushed to operate relay SM over a circuit traced from the regulated power supply 407, the winding of relay SM, and push button 517 to ground. Contacts SM1 transfer to release relay HL and to light a lamp 518 which verifies that the camera is in a run mode. Contacts SM2 switch to extinguish the stand-by lamp 404 and to energize the motor speed control circuit 403. Contacts SM3 close to lock the relay SM in an operated condition under the control of count complete relay contacts CC2. Contacts SM4 close to enable count complete relay CC.

Responsive to the release of high-low relay HL, contacts HL1 close to increase the voltage across the lamp and thereby raise the level of illumination.

If it is not controlled, the sudden decreases the increases in illumination level would produce an effect upon sensors 431, 432 which are photoelectric cells used to detect the presence of a document to be copied. Therefore, the relay contacts SM3 apply a control signal to a bias adjust circuit 437, and a development temperature control circuit 512. In the stand-by low light level mode, contacts SM3 (normal position) cause bias adjust circuit 437 to apply a low bias level to detectors 435, 436 which compares the bias with the outputs of sensors 431, 432. In the run or high light level, contacts SM3 move to the operated position and remove a signal from the bias adjust level circuit 437, which raises the bias applied to detectors 435, 436. Therefore, as the output of the sensors 431, 432 increase or decrease responsive to changes in light level, the comparison bias also changes so that there is no apparent effect upon the detectors 435, 436. Simultaneously, the stand-by mode relay contacts SM3 also act upon a development temperature control circuit 512 to raise or lower the temperature of heating element 42 to raise or lower the temperature at the developing heater shoe 41.

The circuit is now standing ready to receive and record a document. That may be simply a hand fed document; or, it might be a stack of automatically fed documents. If it is a single document, it is hand fed into the camera via a slot 420 on one side of reflector 32, where the document is driven past the reflector, and ejected from another slot 421 on the other side of the reflector.

A stack 423 of documents are placed in a bin 21 from which an automatic clutch feeds them into a pair of nipping rollers 424 which transports them into slot 420. As each document 425 moves from bin 21 toward the slot 420, it moves past a light source 426 which illuminates it. The light is reflected from the document and back into a photocell 427 which feeds a signal into the base of a last document controlled transistor 506, which turns on. When the document 425 passes away from the area of the photocell 427, the reflected light terminates, and the signal is removed from the last document control transistor 506, which turns off. Responsive thereto, a one minute delay timer 507 begins to time out. That one minute is long enough for the completion of the copying process and for the document 425 to clear the camera. If another document 428 is fed into the camera during the one minute delay, transistor 506 turns on to reset the delay period of the timer 507. Hence, there cannot be a time out as long as documents are being fed into the camera. There is a time out only after the end of one minute following the last document to be fed into the camera. For hand fed documents, the reset of timer 507 may be responsive to operation of a manual switch 508 which is pushed each time that a document is fed into slot 420.

As the document 430 feeds through the slot 420, its leading edge blocks the light of source 31 which was falling on an input sensor photocell 431. As the leading edge passes out the slot 421, it blocks the light falling on output sensor photocell 432.

The signal from input sensor 431 is fed into one input of a detector 435 and the signal from output sensor 432 is fed into one input of detector 436. These detectors compare the input signal with a bias voltage supplied from circuit 437 and provide an output or not depending upon the comparison.

Responsive to the input signal from sensor 431, detector circuit 435 feeds a signal through zener diode 440 to bus 441. The zener diode gives a snap action to the input signal. A jam detector 444 is started to measure a period of time responsive to a detection of the leading edge of the document. A film drive solenoid 445, a shutter soleniod 446, and the heating shoe positioning solenoid 68 are energized responsive to the signal from the zener diode. A signal is applied through a reset circuit 510 to start the timing cycle of a one minute delay circuit 507.

The signal from detector 435 is applied to a film drive relay FD which closes its contacts FD1 to energize a film drive clutch 502 for feeding film through the camera. Contacts FD2 close to energize the shutter solenoid 68. This way, the shutter does not open until the film is moving. At this time, the shutter 36 is opened, and the heater position solenoid 68 raises the heating shoe 41 by rotating it about an axis to engage the film.

To record a blip on the side of the film (as at 53-55, FIG. 3), the output of detector 435 is fed through zener diode 440 to a blip control circuit 450 and blip relay BL. The blip relay contacts BL1 energize the blip drive clutch 503 to thereby flip the mirror 67 (FIG. 2) and place a light image on the edge of the film, as at 53-55.

Assuming that the document feeds, as it should, through the camera, the leading edge passes over the photocell sensor 432, cuts off the light, and triggers an output from detector 436. The zener diode 455 gives this output a snap action. The resulting signal is fed to bus 441 for holding the various circuits until after the document has cleared the format area. Since the assumption is that the document moves properly, it passes sensor 432 before the jam detector 444 can time out. Therefore, nothing happens.

However, if the document does not feed properly, the light falling upon sensor 432 is not cut before the circuit 444 times out. Accordingly, a document jammed relay DJ operates. The contacts DJ1 open to remove power from the lamp 31 which goes out to eliminate the heat of the lamp and thereby tend to protect the document. The jammed document is manually removed from the camera.

After the jam document is successfully removed, the jam cleared push button 521 is operated to release the DJ relay. Contacts DJ1 close to re-energize the ballast 401. The lamp 31 is again lit.

As long as documents are fed through the camera, input sensor 431 continues to reset the one-minute delay timer 507. However, after the last document has been fed into the camera circuit, the last document sensor 427 shorts out the latent one minute delay and applies a signal which operates the last document relay LD. Responsive thereto, contacts LD1 close to energize the film drive clutch to insure continued movement of film during an end of recording sequence. Contacts LD2 open to de-energize the auto feed solenoid and thereby terminate the feeding of documents from the bin 21. Contacts LD3 close to enable a counter drive solenoid 522 which causes a wheel 70 to engage, roll along and be driven by movement of the film.

Means are provided for automatically driving the film 37 past the fixing stage 43 so that the last image to be photocopied cannot be fogged if exposed to ultraviolet light at some future date. This means may be operated only when the one minute timer 507 energizes an enable circuit 454 after the last document has been sensed. Each time that a magnet 458 embedded in wheel 70 passes a reed switch 456, contacts close to send a pulse to a counter 457. Hence, it should be obvious that each pulse from contacts 456 represents film travel over a length equal to the circumference of wheel 70. Therefore, the number of pulses counted is equal to or greater than the circumference divided into the distance of the film path between heater 41 and the end of fixing station 43.

When the counter has counted a predetermined number of pulses, circuit 504 feeds a signal through operated stand-by mode contacts SM4 and the winding of count complete relay CC to the power supply 407. Relay CC operates contacts CC1 open to reset to flip-flop 520 and thereby return an inhibit to the one-minute counter 507. Contacts CC2 open to release the standby mode relay SM.

Responsive to the release of relay SM, contacts SM4 open to restore the count complete relay CC. Contacts SM3 release to return the bias circuit 437 and the developing temperature control circuit 512 to stand-by levels. As a result of the bias change, the detectors 435, 436 will not respond to the lowered stand-by level of illumination lamp 31.

Contacts SM1 return to normal to operate high-low relay HL via contacts TD2. Lamp 518 goes out to indicate that all documents have cleared the camera and that the film has been fixed. Contacts SM2 return to normal to disconnect the motor speed control circuit 403 and light stand-by lamp 404.

Responsive to the operation of high-low relay HL, contracts HL1 close to reduce the power applied to lamp 31.

The camera has now returned to normal and is ready to be resequenced during the next demand for photocopy work.

A further advantage of the presently disclosed camera is the provision of a means for adjusting the lens position whereby the lens structure rides on the surface of film 37 and maintains an even distance between the film and the optical system regardless of varying contours and thicknesses of the film and eccentricities or irregularities in the surface of the film drum or capstan 616. Referring to FIGS. 7 and 8, the lens housing 35 has attached to the forward face thereof a frame means 610 having an aperture 612 extending therethrough the accommodate the passage of light through lens 35 to film 37. The front of frame 610 includes two extending rail or flange members 614 which are adapted to engage the lateral edges of film 37 and press the film into engagement with capstan 616. When in the position shown in dotted lines in FIG. 8, film 37 is biased into engagement with capstan 616, and rails 614 engage the edges of the film, where there is no image formed. The central portion of the film is disposed adjacent the central or cavity area 618 of frame 16, and there is no danger of scratching or harming the image receiving area of the film 37. Despite irregularities in film thickness or contour of the capstan, the distance between the lens 35 and film 37 remains constant as the film is driven by the capstan.

Means are provided to manually move lens 35 into and out of the two positions illustrated in FIG. 7. To this end, a pair of brackets 620 are fixed to opposite sides of lens housing 35, and the prongs of a forked lever 622 extend between frame 610 and brackets 620. Lever 622 has a downwardly extending portion 624 (FIG. 8) which is pivotally connected to a cam operator 626, which is pivoted about pin 628 in the direction shown by the arrow "A". As cam operator 626 is moved as described, a portion thereof acts on a segment of camera housing 630, and causes lever 622 to move in the direction indicated by the arrow "B". This movement is transmitted through brackets 620 to lens housing 35, which is suitably mounted and guided for movement between the two positions indicated in FIG. 7.

Those who are skilled in the art will readily perceive how various modifications may be made without departing from the scope and the spirit of the invention. Accordingly, the claims are to be construed to cover all equivalent structures.

I claim:

1. A microfilm camera comprising a supply of instant imaging film threaded through said camera and onto a take-up means, at least one instant developing station means disposed adjacent the path of said film, means for feeding successive documents into a copy station in said camera, means comprising an image optical system for reflecting onto the film an image of a document fed into said camera as said film travels away from said supply and to said developing station, means responsive to the document feed for copying each image and for projecting a signal image onto the film at a point having a predetermined relationship to the image being copied when the signal is being projected, whereby an automatic searching device may count any selected number of said signals to find the image which was being copied when the signal was projected and fixing means for thereafter exposing said film to ambient ultraviolet light to release gas from image areas which did not receive the light of either said image or said signal, and means for thereafter transporting said film from said developing station past said fixing means to said take-up means without exposing said film to a heat sufficient to set an image on said film, whereby all gas released by said fixing means evaporates from said film without any permanent effect thereon.

2. The camera of claim 1 wherein said image reflecting means comprises means for exposing said film to an image illuminated by ultraviolet light, and said signal projecting means comprises a reflector for reflecting said ultraviolet light onto the edge of said film.

3. The camera of claim 1 and timer means for measuring a predetermined period of time after the copying of each image, means for resetting said timer means responsive to each successive document fed into said camera whereby said timer means does not time out as long as documents are successively fed into said camera within said predetermined period of time following the feeding of the last preceding document, and means responsive to the completion of said predetermined time period for driving said film through said camera.

4. The camera of claim 3 and means for measuring the length of film driven through said camera after said time period, said length being at least equal to the distance which said film must travel to pass the fixing means.

5. The camera of claim 1 wherein said document feed means comprises means for moving a document through the image reflecting area, reflector means containing an ultraviolet light source and having a light emitting slit positioned over said image reflecting area, means for moving said film in synchronism with the movement of said document feed means, sensor means for detecting the entrance and exit of said document in said image reflecting area, and means responsive to detection of a slow or non-passage of said document for detecting a jammed document condition.

6. The camera of claim 5 and means responsive to said detection of a jammed document for extinguishing said light source.

7. The camera of claim 1 and a two level ultraviolet light source positioned to illuminate said document when positioned to reflect into said optical system, one of the levels being a stand-by level and the other of said levels being an exposure level, means for normally operating said light source at a lower or stand-by of said two levels, said switching means responsive to a document in said camera for operating said light source at the other or exposure of said two levels.

8. The camera of claim 7 and two-level means for heating said film to develop said signal and an image of said document, and means for switching said heating means between said two levels simultaneously with the switching of said light means between its two levels.

9. The camera of claim 1 and means for detecting low levels of film supply, means for detecting the tension of said film, and means responsive to said detection of a low film supply or of a loss of film tension for stopping said camera.

10. A microfilm camera comprising a supply of instant imaging film threaded through said camera and onto a take-up means, at least one instant developing station means disposed adjacent the path of said film, means for feeding successive documents into a copy station in said camera, means comprising an image optical system for reflecting onto the film an image of a document fed into said camera as said film travels away from said supply and to said developing station, means responsive to the document feed for copying each image and for projecting a signal image onto the film at a point having a predetermined relationship to the image being copied when the signal is being projected, whereby an automatic searching device may count any selected number of said signals to find the image which was being copied when the signal was projected, said image reflecting means comprises means for exposing said film to an image illuminated by ultraviolet light, said signal projecting means comprises a reflector for reflecting said ultraviolet light onto the edge of said film, fixing means for thereafter exposing said film to ambient ultraviolet light to release gas from image areas which did not receive the light of either said image or said signal, means for thereafter transporting said film from said fixing means to said take-up means without exposing said film to a heat sufficient to set an image on said film, whereby all gas released by said fixing means evaporates from said film without any permanent effect thereon, timer means for measuring a predetermined period of time after the copying of each image, means for resetting said timer means responsive to each successive document fed into said camera whereby said timer means does not time out as long as documents are successively fed into said camera within said predetermined period of time following the feeding of the last preceding document, means responsive to the completion of said predetermined time period for driving said film through said camera, means for measuring the length of film driven through said camera after said time period, said length being at least equal to the distance which said film must travel to pass the fixing means, said film length measuring means comprises a wheel running on said film, and means responsive to movement of said wheel for periodically opening and closing a set of contacts.

11. The camera of claim 10 wherein said wheel responsive means comprises a magnet turned by said wheel and said set of contacts comprises magnetically controlled reed contacts.

12. A method of photocopying documents on microfilm comprising the steps of:
a. providing a microfilm, camera, which uses instant imaging film, with an instant developing station built therein;
b. feeding documents through said camera to be copied onto microfilm;
c. providing an image forming station associated with an optical system, positioned along a path which the film follows as it travels through the camera;
d. projecting onto said film a separate signal image which is formed, when an image of a document fed through said camera, is formed on the film; and
e. automatically advancing the images on said film past a developing station and a fixing station, in succession.

13. The method of claim 12 and the added steps of stopping the camera if a document jams in said camera.

14. The method of claim 12 and the added steps of operating said camera at a first low level of energy during stand-by conditions and at a second high level during photocopy conditions.

15. A microfilm camera comprising a supply of film threaded through said camera and onto a take-up means, menas comprising an image optical system for reflecting and image onto said film, as said film passes adjacent said optical system, said optical system comprising:
a lens movable from a first position towards said film to a second position away from said film,
frame means fixed to one end of said lens and including an aperture therethrough for the passage of light from said lens to said film,
said frame including rail members for engaging the lateral edges of said film when said lens is in said second position whereby the distance between said lens and said film remains constant as said film passes adjacent said lens,
a space between said rail members defining an open area whereby said central portion of said film passes adjacent said lens without without contacting said frame.

16. The microfilm camera of claim 15 including manually operable control means for moving said lens between said first and second positions.

* * * * *